United States Patent
Weinmann

[19]

[11] Patent Number: 6,016,041

[45] Date of Patent: Jan. 18, 2000

[54] ROTARY SPEED CONTROL CIRCUIT FOR FEEDING A DC UNIVERSAL MOTOR

[75] Inventor: Martin Weinmann, Bald Waldsee, Germany

[73] Assignee: Ako-Werke GmbH & Co., KG, Wangen, Germany

[21] Appl. No.: 08/936,147

[22] Filed: Sep. 22, 1997

[30] Foreign Application Priority Data

Sep. 25, 1996 [DE] Germany ............................ 196 39 310
Nov. 6, 1996 [DE] Germany ............................ 196 45 667

[51] Int. Cl.[7] .................................................. H02K 23/64
[52] U.S. Cl. ............................................. 318/245; 363/37
[58] Field of Search ..................................... 318/245, 749, 318/807, 811, 798–806; 363/20, 21, 37, 124

[56] References Cited

U.S. PATENT DOCUMENTS 4,615,000   9/1986   Fujii et al. ................................. 363/41
4,838,050   6/1989   Azuma ..................................... 68/12 R
5,241,257   8/1993   Nordby et al. ............................ 318/811

FOREIGN PATENT DOCUMENTS

0671810B1     9/1995   European Pat. Off. .
43 05 477 A1  8/1994   Germany .

*Primary Examiner*—Robert E. Nappi
*Assistant Examiner*—Rina I. Duda
*Attorney, Agent, or Firm*—Scully, Scott, Murphy & Presser

[57] ABSTRACT

A rotary speed control circuit for feeding a dc universal motor for driving a washing machine. A rectifier and a smoothing capacitor derive the operating voltage of the motor from the mains ac voltage and provided for control of the rotary speed is a regulating device (R) which controls a power stage for the motor, the power stage including a power switch (TR1) and a commutation diode (D1) in the topology of a low-setting device. The power stage feeding the motor includes a high-setting inductor (L) and can be switched over from the topology of a low-setting device to the topology of a high-setting device.

2 Claims, 3 Drawing Sheets

ROTARY SPEED CONTROL CIRCUIT FOR FEEDING A DC UNIVERSAL MOTOR

BACKGROUND OF THE INVENTION

1. Field of the Invention

The invention concerns a rotary speed control circuit for feeding a dc universal motor, in particular for driving a washing machine.

In modern washing technology the motor must cover a wide range of rotary speeds, from slow washing speeds up to high spin speeds for properly removing water from the laundry.

2. Discussion of the Prior Art

The foregoing can be achieved on the one hand by field weakening or attenuation of the motor, by the field winding of the motor being switched over from "long field" to "short field", as is known for example from DE 43 05 477 A1. In the long field mode the motor operates at a washing speed of about 300 motor revolutions per minute while in the short field mode the motor operates at a spin speed of for example 12000 motor revolutions per minute.

The motor speed can be regulated with an electronic regulating device which operates a power switch, for example an IGBT (Insulated Gate Bipolar Transistor) for regulation of the motor voltage, in which case a tachogenerator of the regulating device, which is carried on the armature shaft of the motor, indicates the actual value. The on-off ratio of the power switch determines the mean dc voltage applied to the motor and thus controls the rotary speed.

On the other hand, as is also described in DE 43 05 477 A1, for the purposes of increasing the range of rotary speed, the smoothing capacitance connected to a rectifier taking the mains ac voltage can be formed by two capacitors which are connected in series with each other, in such a way that, to double the operating voltage, the electronic regulating device switches the junction of the capacitors to a tapping of the bridge rectifier so that the positive mains half-waves charge up one capacitor and the negative mains half-waves charge the other capacitor.

In the state of the art shown in FIG. 1, as is generally conventional practice in relation to rotary speed control circuits for the operation of a dc universal motor, operation is conducted in accordance with the topology of a low-setting device. The ac voltage feeding the rotary speed control circuit ME is rectified by way of a rectifier GR for feeding the dc universal motor UM. The rotary speed control circuit ME regulates by way of a regulating device R the motor voltage in accordance with the actual signals from a tachogenerator T carried on the armature shaft A, for conformity with the desired reference or target rotary speed. Besides the rotating armature A with commutator and tachogenerator T the dc universal motor UM has the stationary field winding F. The motor voltage is derived from the rectified mains voltage in accordance with the switch-on ratio of the power switch TR1 which is arranged in the topology of a low-setting device. During the on time of the power switch TR1 the full rectified mains voltage is applied to the motor while in the off time of the power switch TR1 the motor current is commutated to the commutation diode D1 and the voltage applied to the motor is thus equal to zero. The motor voltage can be regulated by way of the switch-on ratio of the power switch TR1 between zero to a maximum of the rectified mains voltage, and therewith also the rotary speed of the motor. A continuous motor current is afforded with an advantageously selected high cycle frequency for the power switch TR1 above the audible range (>16 kHz).

In order to enlarge the range of rotary speed, in accordance with the state of the art to achieve high spin speeds, for example over 10,000 revolutions per minute, the field winding F is switched over at the motor with the effect of a field weakening or attenuation action by way of the electrical contact k2, for example by way of the coil K2.

A dc universal motor with a field switching arrangement of that kind for field weakening at the motor is expensive. Doubling the operating voltage by means of two series-connected capacitors in accordance with DE 43 05 477 was also not satisfactory.

SUMMARY OF THE INVENTION

Therefore, taking as the basic starting point a rotary speed control circuit for feeding a dc universal motor, in particular for driving a washing machine, wherein a rectifier and a smoothing capacitor derive the operating voltage of the motor from the mains ac voltage and for controlling the rotary speed there is provided a regulating device which controls a power stage for the motor, said power stage including a power switch and a commutation diode in the topology of a low-setting device, the object of the invention is that of providing an alternative way of enlarging the rotary speed range, in which the motor can be fed with voltages which are clearly above the mains voltage feeding the rotary speed control circuits.

In accordance with the invention that object is attained in that the power stage feeding the motor includes a power inductor and that the power stage can be switched over from the topology of a low-setting device to the topology of a high-setting device.

With those features the voltages of the motor are not only markedly above the mains voltage of the rotary speed control circuit but the motor can also be fed with lower currents so that in the wash mode the power loss in the semiconductor power switches is reduced and the lower current loading of the commutator, which is related thereto, results in a positive influence on the service life of the motor. The maximum increase in the feed voltage for the motor is however not limited to doubling the mains voltage feeding the rotary speed control circuit but can be still further increased. That has the advantage that on the one hand the required wide range of rotary speeds can be achieved even without field weakening or attenuation at the motor and on the other hand the same drive can be fed with a wide input voltage range of from about 110 V to 240 V nominal while maintaining the wide rotary speed range. In addition, without limiting the maximum motor voltage to the mains voltage, there is the possibility of further optimising the motor in regard to service life and weight per unit power insofar as it is operated with higher voltages and lower currents.

Advantageous configurations according to the invention are elucidated in the following detailed description. In that respect it is to be emphasised that in accordance with the invention there is provided a dc voltage capacitor C1 in an intermediate circuit of the power stage, which must smooth the dc voltage only in the frequency range of the cycle frequency of the power switch at >16 kHz and not in the range of the mains voltage frequency whereby the expenditure for a mains filter for compliance in respect of IEC 555 (mains reaction due to current harmonics) is considerably reduced as the mains current consumption is almost sinusoidal.

BRIEF DESCRIPTION OF THE ACCOMPANYING DRAWINGS

Reference may now be had to the following detailed description of the invention, taken in conjunction with the accompanying drawings; in which:

DETAILED DESCRIPTION OF PREFERRED EMBODIMENT

The topology terms of high-setting device (boost converter) and low-setting device (buck converter) which are used in the description hereinafter and also hereinbefore are standard circuits for switching mains portions and are described in relevant reference works such as for example in "Das grosse Werkbuch Elektronik" Franzis-Verlag, 1994 edition, page 2933 ff. Not to be confused therewith is the standard circuit of the low-setting-high-setting device (buck-boost-converter), as is also referred to in the above-indicated literature. On the contrary the invention concerns a combination or modification of known topologies, which is advantageous in terms of the drive of washing machines. In the case of the topology referred to herein as the low-setting device the output stage only comprises an inductance in the form of a dc universal motor with free running diode.

Figure 1:
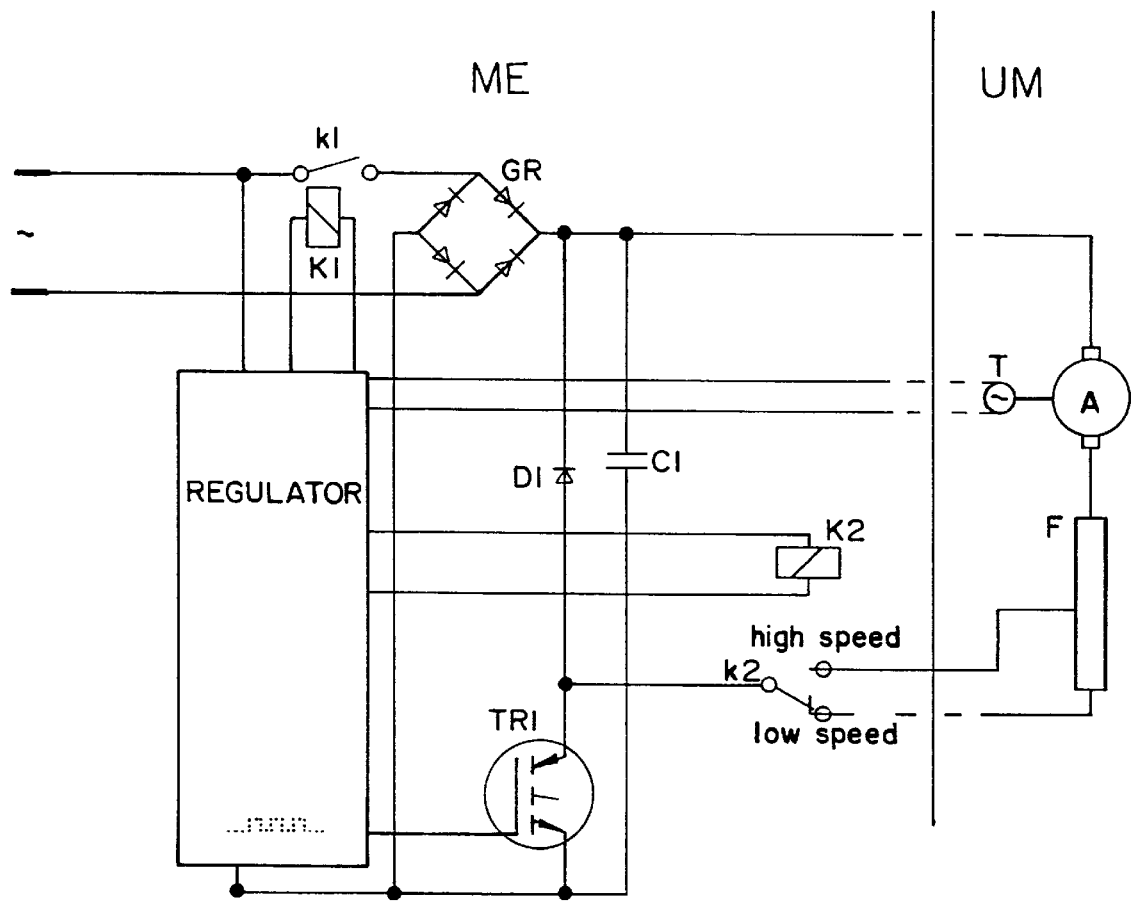
Figure 2:
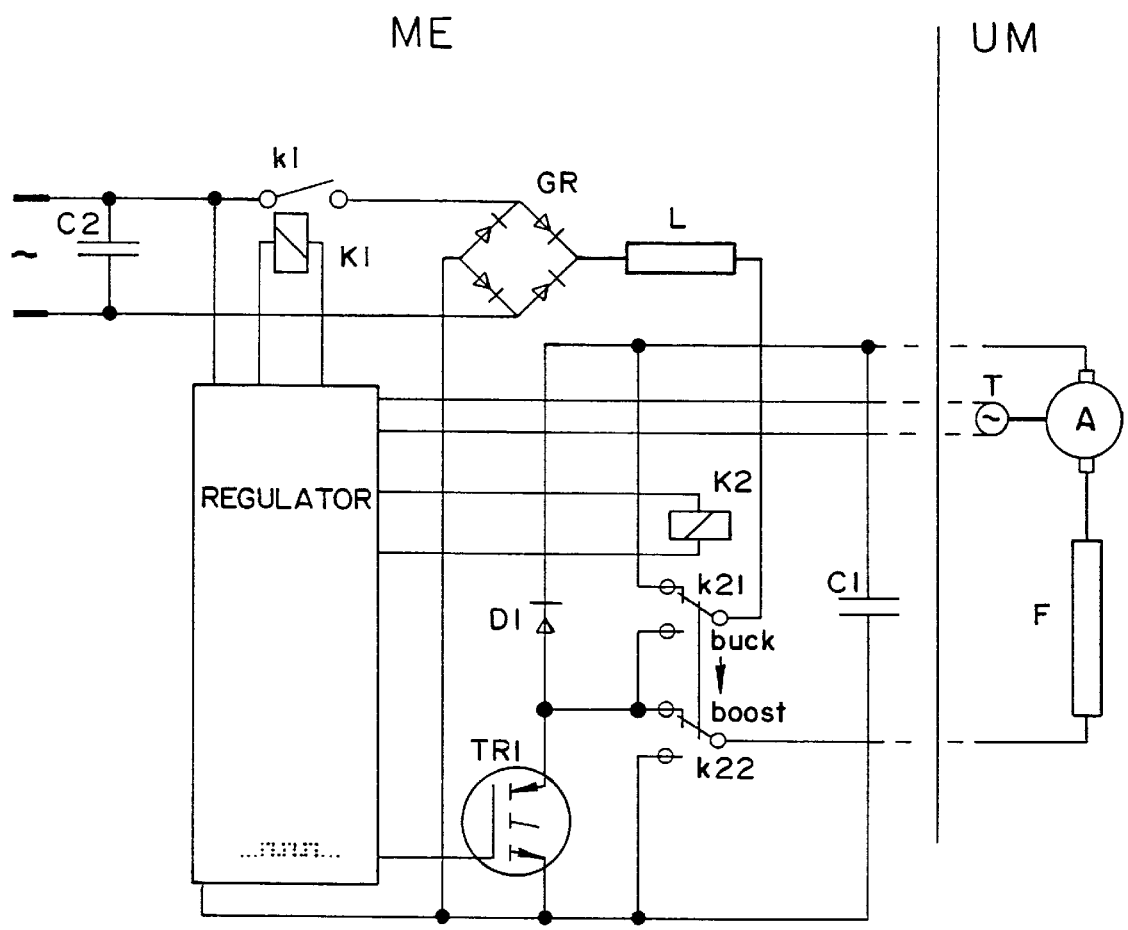
Figure 3:
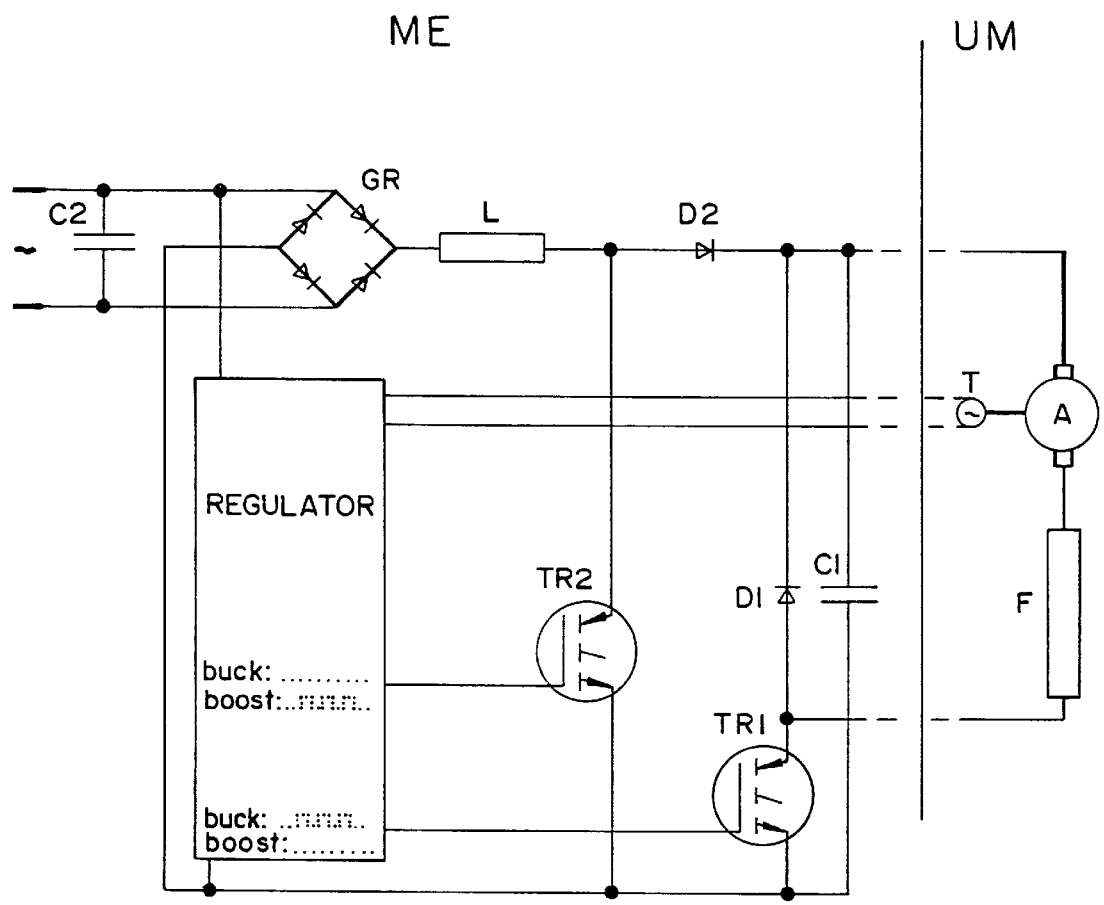

As in the state of the art shown in FIG. 1, the embodiments according to the invention as shown in FIGS. 2 and 3 which also show the topology of a low-setting device provide that the motor voltage is derived in accordance with the switch-on ratio of the power switch TR1 from the rectified mains voltage. In the topology of a low-setting device (buck converter) the motor UM is in series with the active power switch TR1, by way of the switch-on ratio of which the motor voltage can be regulated between zero and the rectified mains voltage. The electrical contacts k21, k22 which can be acted upon by a winding K2 are disposed in that case in the rest position shown in FIG. 2. In that topology, as in the state of the art (foregoing description relating to FIG. 1), the motor UM is regulated at low motor voltages, that is to say low rotary speeds (washing). If the motor UM is to be increased to a high speed of rotation, it must be fed with a correspondingly higher voltage.

In accordance with the invention that is achieved in that the contacts k21, k22 in FIG. 2 are switched over by means of the winding K2 in such a way that now the high-setting inductor or choke L is in series with the active power switch TR1, as can be seen from FIG. 2, so that then the motor voltage can be raised beyond the value of the rectified mains voltage by way of the switch-on ratio of the active power switch and the current resulting therefrom in the high-setting inductor or choke L. In that topology in which the power stage is switched over from the low-setting device (buck converter) to the high-setting device (boost converter) the motor is in parallel with a dc voltage capacitor C1 and the power switch TR1 with diode D1. The high-setting inductor L leads from the rectifier GR to the junction between the diode D1 and the switch TR1. The current impressed into the high-setting inductor L over the on time of the power switch TR1 commutates during the off time of the same switch by way of the commutation diode D1 to the dc voltage capacitor C1. In that topology the motor voltage is at least equal to the rectified mains voltage and thus the direct current in the motor is always greater than zero. It is thus desirable, prior to the topology being switched over from the high-setting device to the low-setting device (by way of the contacts k21 and k22) for the power stage with the rectifier GR to be separated from the mains by way of the contact k1 in the ac circuit in order to prevent the contacts k21 and k22 being overloaded by the switching of direct currents.

As shown, in the embodiment of the invention as shown in FIG. 3 the topologies of a low-setting device for low motor voltages and the topology of a high-setting device for high motor voltages are parallel. A power switch TR1 with commutation diode D1 forms the low-setting device while a power switch TR2 and the commutation diode D2 together with a high-setting inductor or choke L forms the high-setting device. Depending on the actuation of one of the power switches TR1, TR2, the power stage is in the topology of a low-setting device or a high-setting device. If the motor UM is to be fed with voltages less than the rectified mains voltage, the power switch TR2 remains open and the power switch TR1 is cycled with a switch-on ratio in accordance with the desired motor voltage. If the motor UM is to be fed with voltages higher than the rectified mains voltage, the power switch TR1 remains statically closed and the power switch TR2 is cycled with a switch-on ratio in accordance with the desired motor voltage.

An advantage with the circuit arrangement shown in FIG. 3 is that no switchable contact k1 as shown in FIG. 1 or FIG. 2 is necessary for separation of the power stage from the mains as uncontrolled acceleration of the motor UM, by virtue of a short-circuit in the power switch TR1, can be prevented by static switching-on of the power switch TR2. By way of a simple safety fuse (not shown) the power stage and therewith the motor UM can be separated from the mains by virtue of the high mains current which is involved with static switching-on of the power switch TR2.

In both embodiments the motor voltage can be regulated as desired continuously from zero by means of the high-setting inductor L to far above the value of the mains voltage if the topology of the power stage of the rotary speed control circuit ME is switched over from low-setting to high-setting mode at the working point where the motor voltage corresponds to the rectified mains voltage. The rise in motor voltage is not limited to doubling of the mains voltage feeding the rotary speed control circuit, but can be still further increased.

I claim:

1. In a rotary speed control circuit for feeding a DC universal motor, such as for driving a washing machine, including a rectifier (GR) and a smoothing capacitor (C2) which top off an operating voltage for said motor from a main alternating-current voltage; a regulating device (R) for controlling the rotational speed of said motor (UM); and a power stage of the regulating device (R) which includes a power switch (TR1) and a commutation diode (D1) and which controls the motor (UM); the improvement comprising:

(a) said power stage of the regulating device (R) including a high-setting inductor (L); and a circuit arrangement of a low-setting topology wherein electrical contacts (K21, K22) connect said motor (UM) and power switch (TR1) connected in series with said high-setting inductor (L) and for switching said power stage to a circuit arrangement of a high-setting topology having the high-setting inductor (L) and power switch (TR1) connected through said electrical contacts (K21, K22), in which a direct-current capacitor (C1) is connected in parallel with said motor (UM);

(b) and said direct-current capacitor (C1) is arranged in an intermediate circuit which is connected in parallel with the circuit arrangement of the low-setting topology and in parallel with the circuit arrangement of the high-setting topology.

2. A rotary speed control circuit as claimed in claim 1, wherein a switchable contact (K1) disconnects the power stage of the regulating device (R) from the main alternating-current voltage prior to the switching over of the circuit arrangement from the high-setting topology to the low-setting topology.

* * * * *